Figure 1:
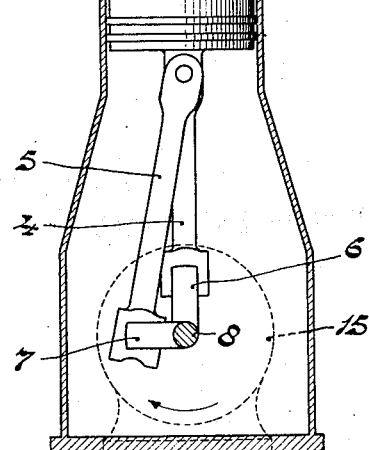

July 2, 1957 C. O. JONKERS 2,797,539
METHOD AND APPARATUS OF MAKING A REGENERATOR
Filed Aug. 23, 1952 2 Sheets-Sheet 1

INVENTOR
CORNELIUS OTTO JONKERS
BY
AGENT

July 2, 1957 C. O. JONKERS 2,797,539
METHOD AND APPARATUS OF MAKING A REGENERATOR
Filed Aug. 23, 1952 2 Sheets-Sheet 2

INVENTOR
CORNELIUS OTTO JONKERS
BY
AGENT

United States Patent Office 2,797,539
Patented July 2, 1957

2,797,539

METHOD AND APPARATUS OF MAKING A REGENERATOR

Cornelius Otto Jonkers, Eindhoven, Netherlands, assignor, by mesne assignments, to North American Philips Company, Inc., New York, N. Y., a corporation of Delaware Application August 23, 1952, Serial No. 306,013

Claims priority, application Netherlands September 14, 1951

6 Claims. (Cl. 53—24)

This invention relates to regenerators for use in hot-gas reciprocating apparatus and more particularly to heat regenerators having filling material consisting of one or more lengths of wire with a hydraulic diameter smaller than 50 microns.

The term hot-gas reciprocating apparatus is here to be understood to include hot-gas reciprocating engines, refrigerating apparatus operating according to the reversed hot-gas reciprocating engine principle and heat pumps.

The term hydraulic diameter of filamentary material is to be understood to mean the quotient of four times the surface area and the circumference of a cross-section of the wire material. The wire may have a round cross-section or another type of cross-section, for example, a rectangular cross-section. The value of the hydraulic diameter of the filamentary material is important for the thermodynamic and aerodynamic properties of the regenerator filling material and this value is generally used in computing heat regenerators.

Heat regenerators are frequently made from metal wire. Thus, for example, a heat regenerator can be made by coiling a wire crinkled according to a fixed pattern, the deformations extending in the direction of length of the regenerator. The heat regenerator thus obtained generally satisfies the requirements imposed i. e.

(1) the heat regenerator should have a sufficient heat capacity.

(2) the free space in the heat regenerator should not be too large.

(3) the heat regenerator should not have an excessive resistance to flow.

(4) the thermal conduction from the hot side of the heat regenerator to its cold side should not be too great.

(5) the structure of the filling material should preferable be such that the resistance to flow is as uniform as possible throughout the cross-sectional area of the heat regenerator, so that the same thermodynamic effect is obtained throughout.

Moreover, the heat regenerator satisfying the aforesaid conditions should not be too expensive. The heat regenerator according to the invention satisfies the aforesaid requirements better than hitherto known heat regenerators and has the additional advantage of being easy to manufacture.

To this end it has the feature that the filamentary material has an irregular curly structure and the curls extend substantially at right angles to the main direction of flow of the gas through the regenerator. The curly structure is preferably irregular and the curls may alternate with non-curled lengths of wire. The curls may either be large or small, for example 15 mms. or more, down to 3 mms. and even smaller. The curls preferably extent at right angles to the main direction of flow through the heat regenerator. As an alternative, however, they may extend slightly obliquely to the said main direction of flow. If the heat regenerator has cylindrical walls, the main direction of flow of the gas is parallel with a generatrix of this cylindrical wall.

In one form of the heat regenerator, according to the invention, the filling material has a stratified structure. The heat regenerator, according to the invention, is easy to manufacture. According to the invention, one of the features of said heat regenerator is that by the action of compressed gas the wire material is supplied through one or more spray nozzles to a chamber and abuts against a permeable wall located at right angles to the main direction of flow of the gas through the chamber, the cross-section of said chamber corresponding at least substantially to the cross-section of the heat regenerator and the nozzle being so arranged as to cause the wire material in the chamber to move substantially in the main direction of flow of the gas through the chamber, the filling material thus formed being subsequently compressed in the main direction of flow.

Applicant has found, that in a further embodiment of the invention, it is particularly desirable to provide besides the air-current supplied to the nozzle another air current by which the filling material produced is compressed in the main direction of flow in the said chamber. Particularly, when annular heat regenerators are to be made, it is moreover desirable to rotate the chamber with respect to the nozzle.

Applicant has furthermore found that it is advantageous to use small curls for the heat regenerator filling material. To this end, the wire material, prior to its being introduced into the chamber, is subjected to such bending stress as to crinkle the wire.

If the filling material consists of drawn wire material it is also possible for the wire, after having been drawn out to the desired diameter, to be supplied to the chamber with the degree of hardness resulting from the drawing operation, so that the wire will generally tend to crinkle spontaneously.

Consequently the wire thus supplied is not annealed after the drawing operation. If desired, such a wire may subsequently be subjected to bending stress in order to obtain crinkles of relatively different size.

The device by means of which the method according to the invention is carried out has the feature that it comprises a chamber, whose cross-sectional area corresponds at least substantially to the cross-section of the regenerator chamber, and at least one spray nozzle for supplying wire material to said chamber, the latter being provided with a permeable wall at one side and at least one wire reel being provided for the wire material.

A suitable form of the device comprises means for rotating the chamber with respect to the spray nozzle.

The filling material should have a sufficient number of curls. In one embodiment of the invention this is achieved by providing that the average peripheral speed of the chamber with respect to the nozzle is at most half that at which the wire material is supplied to said chamber.

Figure 2:
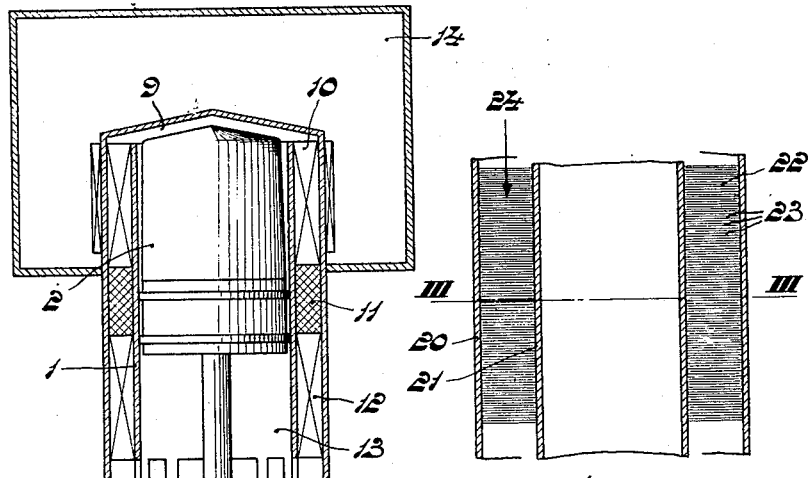
Figure 3:
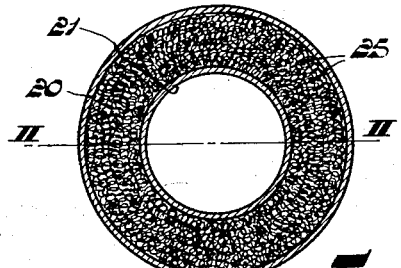
Figure 4:
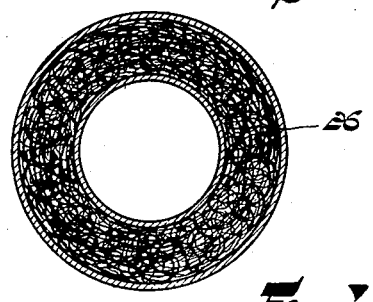
Figure 5:
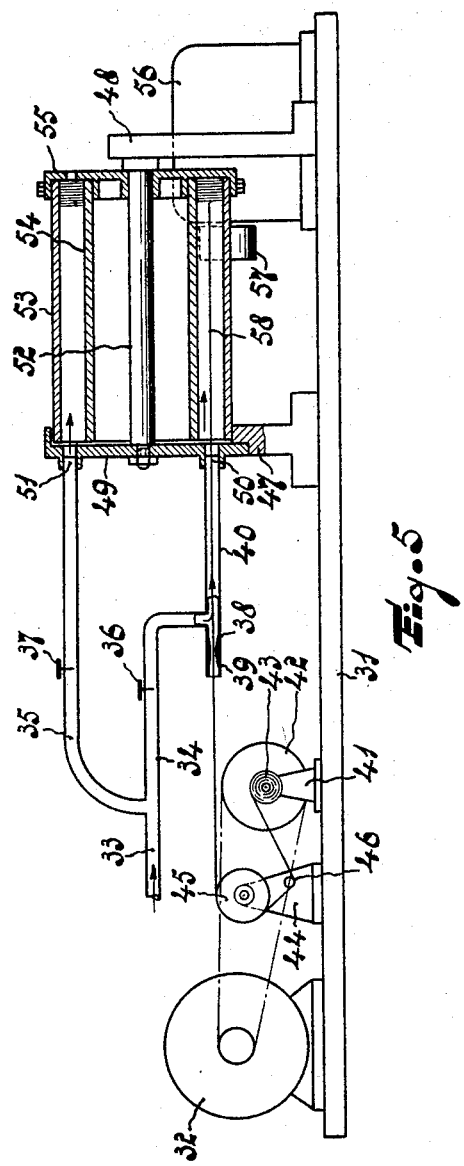

In order that the invention may be readily carried into effect, it will now be described in greater detail with reference to the accompanying drawings, given by way of example, and in which Fig. 1 is a sectional side view of a hot-gas reciprocating apparatus, Fig. 2 is a longitudinal sectional view on line II—II of Fig. 3 of a heat regenerator on a larger scale, Fig. 3 is a cross-sectional view of the heat regenerator on line III—III of Fig. 2, Fig. 4 is a cross-sectional view of a heat regenerator with larger curls than in Fig. 3, and Fig. 5 is a side elevation view partly in section showing the device for manufacturing the heat regenerator.

The hot-gas reciprocating apparatus shown in Fig. 1 is a cold gas refrigerating apparatus. Notably in cold gas refrigerating apparatus it is vital that the regenerator should satisfy the most stringent requirements, so that particularly in such apparatus the heat regenerator according to the invention may be used with advantage. In the cylinder 1, a displacer 2 and a piston 3 reciprocate with a constant phase-difference, the displacer leading with respect to the piston. Both the displacer 2 and the piston 3 are connected through a system of connecting rods 4, 5 of their own to cranks 6 and 7 respectively of a common crank shaft 8. The chamber 9 above the displacer 2 is the freezing chamber of the machine, which chamber communicates through a freezer 10, a heat regenerator 11 and a cooler 12 with the space 13 between the displacer 2 and the piston 3, the last-mentioned space being termed the cooled space.

Through the wall of the freezer 10 and through the wall of the freezing chamber 9 thermal energy is supplied to the medium following a closed thermodynamic cycle in the apparatus. This thermal energy is withdrawn from the space 14 surrounding the freezer and from the freezing chamber, so that this chamber attains a low temperature. In the cooler 12 thermal energy is carried off from the medium in the apparatus. This energy may, for example, be given off to water or to the open air.

The refrigerating apparatus is driven from an electric motor 15. As an alternative, other engines, for example gasoline engines or diesel engines may drive the refrigerating apparatus. The heat regenerator 11 of this refrigerating apparatus is made in accordance with the invention and will be described with reference to Figs. 2, 3 and 4.

The heat regenerator is annular and has an outer wall 20 and an inner wall 21, the latter generally being the cylindrical bushing in which the piston and/or the displacer move to and fro. The filling material 22 consists of a larger number of layers 23 of comparatively small thickness in general not materially exceeding several times the thickness of the wire. The layers extend at right angles to the main direction of flow of the gas through the regenerator, this direction being indicated by the arrow 24.

The wire material, which consists of a comparatively small number of wire lengths, has an irregular curly structure, as shown in Fig. 3, the curls 25 extending transversely of the main direction of flow 24. In this embodiment, the wire material preferably consists of drawn copper wire having a thickness of 30 microns. Prior to introducing the copper wire into the chamber, wherein the regenerator filling material is formed, it is subject to bending stress. A similar structure is obtained if the wire material, after having been drawn out to the required size, is not annealed. The filling factor of the regenerator is preferably smaller than 30% and, in the present embodiment preferably amounts to 20%.

Fig. 4 is a cross-sectional view of a heat regenerator in which the wire material has not previously been subjected to bending stress, or has been annealed. In this event the curls 26 are larger than in the embodiment shown in Fig. 3 and alternate with substantially not curved wire lengths. This heat regenerator consists of chromium-nickel wire having a diameter of 25 microns, the filling factor being 16%.

As appears from the accompanying drawing, the regenerator is not uniform, that is to say, that the curly structure is uneven in all the layers and the contact points between the wires and the wall are irregularly located throughout the outer surface and the inner surface of the regenerator.

The examples show annular heat regenerators, but it is also possible to make heat regenerators having the same structure, and being, for example, cylindrical. Heat regenerators may alternatively consist of segments obtained by cutting up an annular heat regenerator made according to the aforesaid methods.

The device for making the heat regenerators according to the invention is shown in Fig. 5. This device comprises a frame 31 mounting an electric motor 32. An air pipe 33 may be connected to a compressor or to a delivery pipe. The air pipe 33 has two branches 34 and 35, either one of which is provided with cocks 36 and 37 respectively.

Pipe 34 is connected to a supply conduit 39 for the wire having an integral discharge portion 40. A restriction 38 is located in conduit 39. Secured to the frame 31 is a support 41 to which a rope pulley 42 is mounted for rotation. This rope pulley may have secured to it a wire reel 43 and is driven by said electric motor 32. A second support 44 carries a wire guide 45 and has secured to it a mandrel 46 over which the wire is bent during its transport to the restriction 38.

The frame further carries two support or standards 47 and 48. Support 47 has secured to it a lid 49 furnished with two apertures 50 and 51 to which the pipes 40 and 35 may be connected. By means of the wire rod 52, the lid 49 is further secured to the support 48. In the lid 49 cylinders 53 and 54, which are secured to a common perforated lid 55, are adapted to rotate commonly about the wire rod 52. The cylinders are caused to rotate by a motor 56 comprising a friction wheel 57 engaging the cylinder 53.

The operation of the device is as follows: The motor 32 causes the rope pulley 42 to rotate so that the wire reel 43, from which the wire 58 is introduced into the supply conduit 39 by way of the mandrel 46 and the wire guide 45, will unwind. By means of compressed air supplied to pipe 33, the wire is conveyed through pipe 40 and supplied to the cylinder chamber between the cylinders 53 and 54. The cylinders are caused to be rotated by the electric motor 56. Through pipe 35 an additional quantity of air is supplied to the cylindrical chamber with the result that the curls in the chamber are compressed in the main direction of flow. In this device, the supply of additional air is diametrically opposite the wire supply. This is however not absolutely necessary. The air leaves the chamber through the permeable wall constituting a lid 55. Due to the rotation of the cylinders and the wire supply the wire is formed in curls extending at right angles to the main direction of flow of the gas through the chamber. The bending about the mandrel 46 results in that the curls are comparatively small and irregular, as shown in Fig. 3. In order to obtain a sufficient number of curls the average peripheral speed of the cylinders should at the most be half the speed at which the wire material is supplied.

After the annular space has been filled with wire, the material is compressed in the main direction of flow thus obtaining the desired filling factor.

This method permits in particular of making regenerators whose resistance to flow is as even as possible throughout the cross-sectional area of flow.

A regenerator thus made further has the property that the regenerator filling material offers only little resistance to pull in the main direction of flow, but offers much more resistance to pull in all directions in the plane in which the curls extend, that is to say at right angles to the main direction of flow.

Although the device set out above comprises only one nozzle it is quite possible to equip it with a plurality of nozzles each having a wire reel of its own.

The lid 49 together with the regenerator may be introduced as a whole into the hot-gas reciprocating apparatus, so that the regenerator need not be removed from the cylinder, which might cause damage.

While I have thus described my invention with specific examples and embodiments thereof, other modifications will be readily apparent to those skilled in the art without departing from the spirit and the scope of the invention as defined in the appended claims.

What I claim is:

1. A method of making a regenerator comprising the steps of supplying wire material to a chamber by means of a first compressed gas stream, providing a second compressed gas stream entering said chamber at a place spaced from the entrance of said first compressed gas stream to said chamber whereby the wire material moves substantially in the main direction of the gas flow thus forming a filling material which becomes compressed in stratified layers in the main direction of said flow.

2. A method of making a regenerator comprising the steps of supplying wire material to a chamber by means of a first compressed gas stream, providing a second compressed gas stream entering said chamber at a place spaced from the entrance of said first compressed gas stream to said chamber whereby the wire material moves substantially in the main direction of the gas flow thus forming a filling material which becomes compressed in stratified layers in the main direction of said flow, and rotating said chamber with respect to said compressed gas streams.

3. A method of making a regenerator comprising the steps of bending wire material, supplying wire material to a chamber by means of a first compressed gas stream, providing a second compressed gas stream entering said chamber at a place spaced from the entrance of said first compressed gas stream to said chamber whereby the wire material moves substantially in the main direction of the gas flow thus forming a filling material which becomes compressed in stratified layers in the main direction of said flow.

4. An apparatus for making a regenerator having wire material therein comprising a chamber, a main conduit connecting to said chamber and having compressed gas therein for supplying said wire material to said chamber, a second conduit branching off from said main conduit and connected to said chamber at a location spaced from said main conduit whereby said wire material is compressed in the chamber by part of said compressed gas, said chamber being provided with a permeable wall at one end thereof, and at least one wire reel for supplying said wire material to said main conduit.

5. An apparatus for making a regenerator having wire material therein comprising a chamber, a main conduit connecting to said chamber and having compressed gas therein for supplying said wire material to said chamber, a second conduit branching off from said main conduit and connected to said chamber at a location spaced from said main conduit whereby said wire material is compressed in the chamber by part of said compressed gas, said chamber being provided with a permeable wall at one end thereof, at least one wire reel for supplying said wire material to said main conduit, and an additional conduit connected to said main conduit having a restriction therein through which said wire material is fed into said compressed gas stream in said main conduit.

6. An apparatus for making a regenerator having wire material therein comprising a chamber, a main conduit connecting to said chamber and having compressed gas therein for supplying said wire material to said chamber, a second conduit branching off from said main conduit and connected to said chamber at a location spaced from said main conduit whereby said wire material is compressed in the chamber by part of said compressed gas, said chamber being provided with a permeable wall at one end thereof, and at least one wire reel for supplying said wire material to said main conduit, and means for rotating said chamber with respect to said compressed gas streams the average speed of said chamber being no more than half the speed at which said wire material is supplied to said chamber.

References Cited in the file of this patent

UNITED STATES PATENTS

| | | |
|---|---|---|
| 1,879,356 | Lindemann | Sept. 27, 1932 |
| 2,115,423 | Korver | Apr. 26, 1938 |
| 2,190,597 | Dritz | Feb. 13, 1940 |
| 2,347,046 | Geiger | Apr. 18, 1944 |
| 2,405,725 | York | Aug. 13, 1946 |
| 2,492,788 | Dennis | Dec. 27, 1949 |
| 2,564,100 | Du Pre | Aug. 14, 1951 |
| 2,595,262 | Hood | May 6, 1952 |
| 2,616,668 | Van Weenen et al. | Nov. 4, 1952 |